United States Patent Office 2,698,703
Patented Jan. 4, 1955

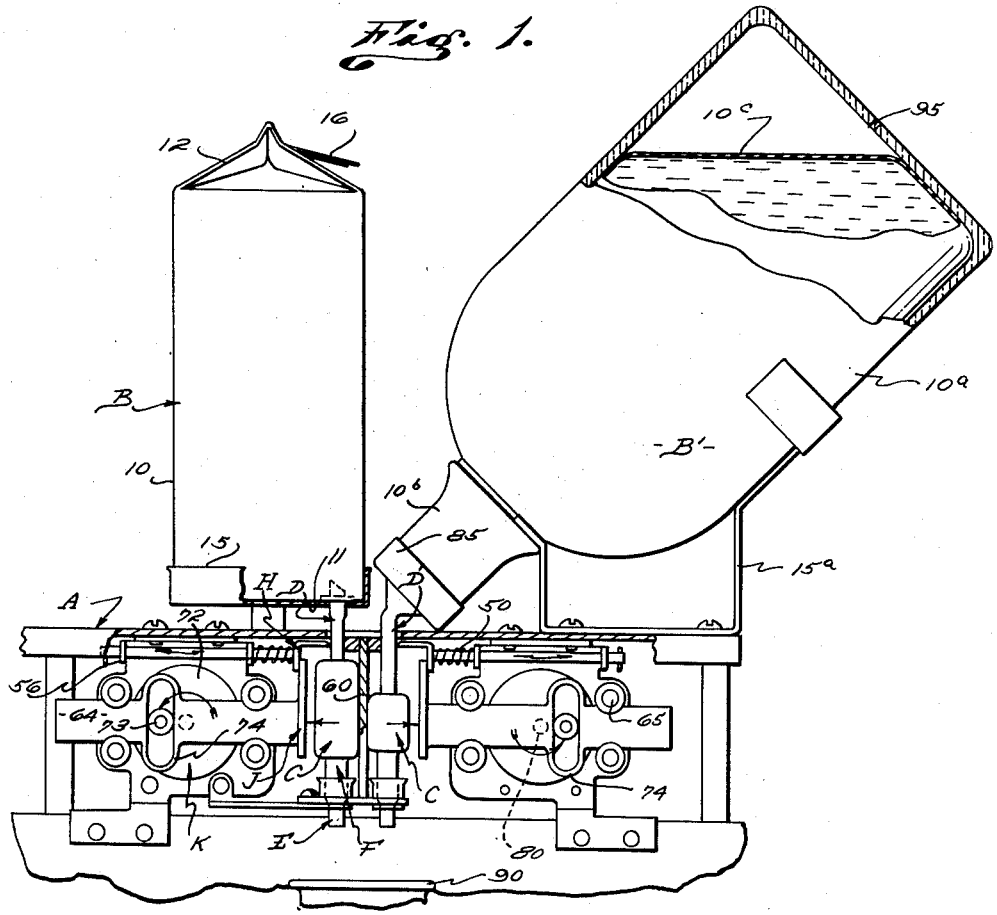
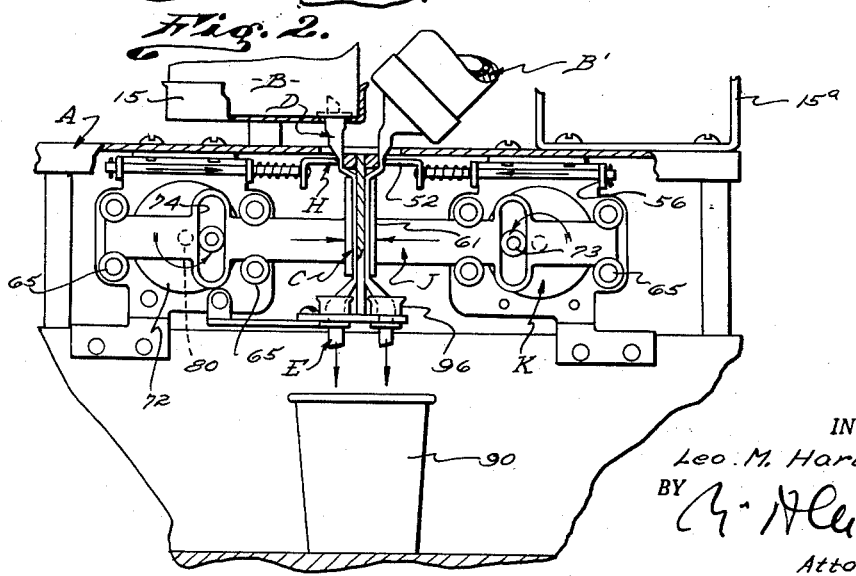

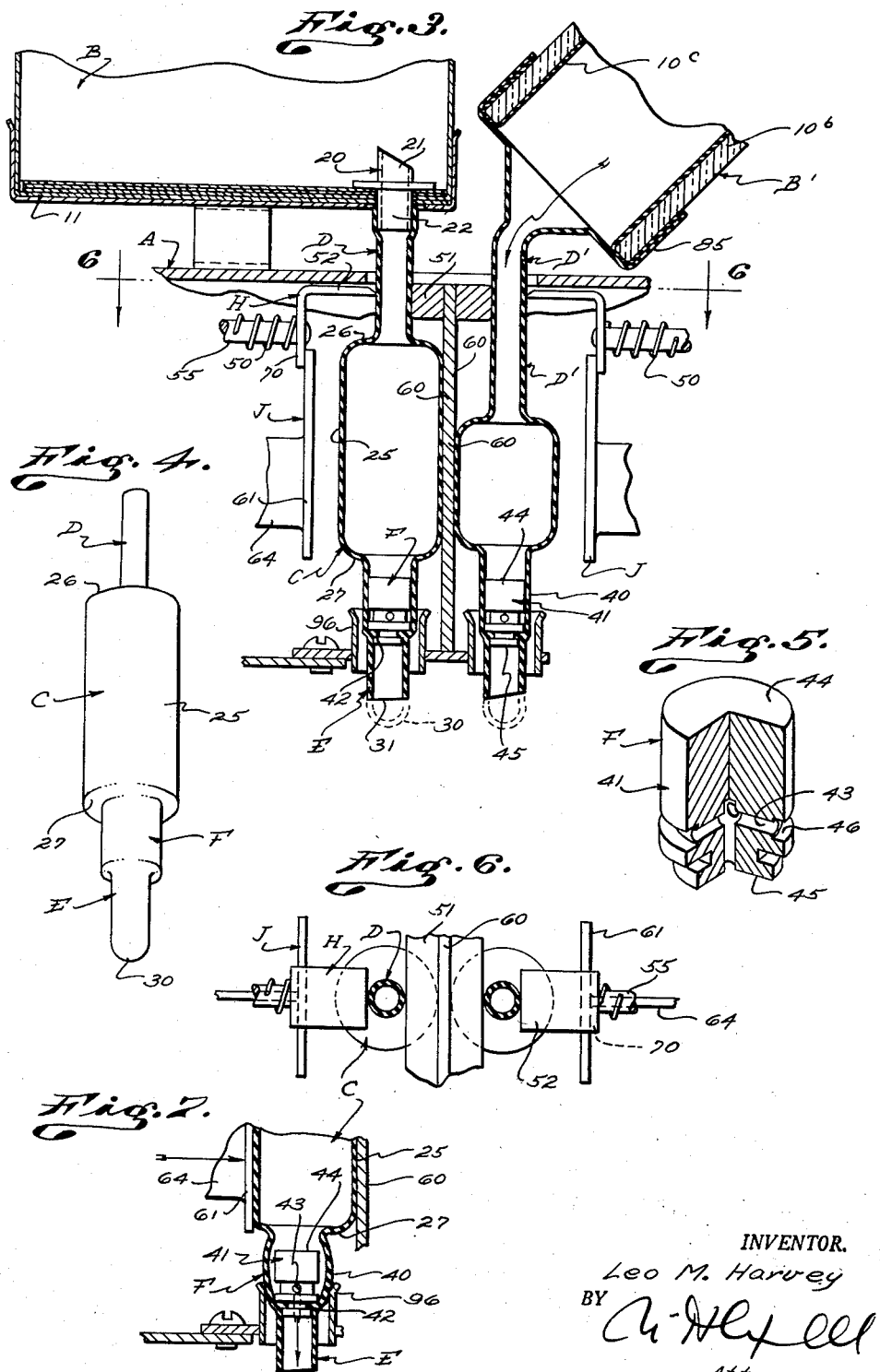

2,698,703

LIQUID DISPENSER DELIVERING MEASURED QUANTITIES

Leo M. Harvey, Los Angeles, Calif.

Application June 26, 1950, Serial No. 170,351

4 Claims. (Cl. 222—207)

This invention has to do with a liquid dispenser and it is a general object of the invention to provide a simple, practical, improved machine involving a mechanism that will effectively, dependably and accurately handle a liquid and which can be used singly or in multiples.

There are numerous situations where a liquid is to be dispensed and where it is desired that the liquid be dispensed in measured quantities. As an example of such a situation a machine dispensing liquid to enter into a beverage is required to accurately and dependably dispense a measured quantity of extract, syrup or other liquid, as circumstances require. In the type of machine just referred to it may be required to dispense more than one liquid into a single cup or receptacle, for example, one liquid may be an extract such as an extract of coffee for preparing a beverage, while the other may be cream or syrup for sweetening the beverage.

It is a general object of this invention to provide a mechanism that will effectively and dependably handle a liquid in such manner as to dispense or deliver measured quantities of the liquid and which is such that it can be used to advantage alone or apart from other dispensing devices, or can be used in groups or with another like mechanism to the end that two different liquids are handled in a single, simple, compact machine.

A further object of the invention is to provide a liquid dispenser of the general character referred to wherein a collapsible cell of a predetermined size is coupled with a supply container and delivers liquid to a spout through an outlet valve, flow from the container to the cell being governed by positive stop means or cut-off so that as the cell is collapsed, to effect discharge of liquid therefrom, there is no return of liquid into the supply container.

It is an object of the invention to provide a mechanism of the general character referred to in which the outlet valve that passes liquid from the collapsible cell is of simple, inexpensive construction limited to a simple, tubular body of rubber and a small, inexpensive core operating in the body to open and pass liquid only when a predetermined pressure is exerted thereon.

The mechanism as provided by the present invention considered as a single unit involves, generally, a frame which supports the working parts. A container is supported by the frame and may, in practice, vary widely in size and character with the liquid to be handled. A supply duct is coupled to the lowermost part of the container through a suitable fitting and delivers liquid from the container to a collapsible measuring cell. It is preferred that the measuring cell and the supply duct be formed of rubber, or the like, and that they be formed as a single, integral unit. An outlet valve controls flow from the measuring cell and delivers the dispensed fluid through a spout. The outlet valve is characterized by a tubular body, preferably of rubber, integral with the cell, and a rigid core in the body and so mounted and related to the body as to cooperate therewith and pass liquid only when predetermined pressure is applied thereto. It is preferred that the outlet spout, valve, cell and supply duct be formed of one continuous or-integral body of rubber which may be of light construction so that these parts form a unit that can be advantageously combined with an expendable container. A cut-off or stop means is provided to act upon the supply duct and involves cooperating or relatively movable members at opposite sides of the duct, one of the members being stationary and the other shiftable. The shiftable member operates to engage the duct and pinch it against the stationary member, and thus stop flow through the duct. A cell operating means is provided and involves two relatively movable members at opposite sides of the cell, one of which is preferably stationary while the other is shiftable. The shiftable member is in the nature of a plate and may be carried on a reciprocating stem. A drive for the cell operating means serves to reciprocate the plate so that it is moved into and out of pressure engagement with the cell. In accordance with the invention the plate of the cell operating means is coordinated with or cooperates with the movable member of the stop means so that when the plate is advanced toward the cell the movable member of the stop means first engages the supply duct and cuts off flow and remains in the actuated position while the cell is collapsed, whereas when the plate is retracted and moved away from the cell the movable member of the stop means is engaged and moved away from the duct.

A feature of the invention is the construction which makes it possible to form the collapsible cell of a simple, elongate tubular element effectively emptied by lateral pressure exerted by the shiftable plate. The invention contemplates that two mechanisms may be incorporated in a single machine and arranged in close proximity so that a very simple, compact arrangement handles two different liquids and delivers them in such manner as to discharge into a common receptacle such as a drinking vessel or cup. In a preferred arrangement the stationary or abutment element of the cell operating means, where two means are employed, may be a single or common element with the cells at opposite sides thereof and thus arranged in close proximity to each other.

The various objects and features of my invention will be fully understood from the following detailed description of a typical preferred form and application of the invention, throughout which description reference is made to the accompanying drawings, in which:

Fig. 1 is a view of the machine embodying the present invention showing two dispensing mechanisms, each embodying the present invention and incorporated in a single unit, certain parts being broken away to show in section. Fig. 2 is a view similar to a portion of Fig. 1 and showing the mechanisms both operated. Fig. 3 is an enlarged detailed sectional view of various essential parts as provided by the present invention, showing the parts in the position illustrated in Fig. 1 of the drawings. Fig. 4 is a perspective view of a unit to be employed in the mechanism and combining in a single integral element portions of several different parts of the mechanism. Fig. 5 is a perspective view of the valve core employed in the element shown in Fig. 4 and showing a part thereof broken away to appear in section. Fig. 6 is a plan section taken as indicated by line 6—6 on Fig. 3 and Fig. 7 is a vertical sectional view of a portion of the of the mechanism shown in Fig. 3 partially operated to show the valve open.

The present invention provides, generally, a machine for handling liquids, preferably operating to dispense measured quantities of liquid. The invention contemplates dispensing a single liquid in measured quantities where this is desired. For purpose of example I have illustrated a situation where two different liquids are handled in a single machine and certain variations are incorporated in the machine to accommodate liquids of different characters. For example, to the left in Fig. 1 I have illustrated a mechanism suitable for dispensing a liquid such as cream or milk, in which case an expendable container in the form of a carton can be used to advantage and is open at its upper end when in use. At the right in Fig. 1 I illustrate a mechanism wherein there is an expendable container that can be used to advantage to handle a liquid extract such, for example, as a coffee extract, which is of such nature as to require that a seal be maintained separating it from air until it is actually dispensed. In this latter case the container is in the nature of a bottle with a collapsible liner.

It is believed that the nature of the present invention as it is applicable to a single dispensing mechanism and as it is applicable to a machine involving multiple mechanisms, will be fully understood from the drawings and from the following description which makes particular reference to the particular details that are illustrated in the drawings, The machine illustrated involves, generally, a frame A that serves as a support or carrier for the various working elements of the machine, a mechanism shown at the left throughout the drawings and involving, generally, a container B, a collapsible cell C, a supply duct D, an outlet or delivery spout E, an outlet valve F controlling flow from the cell to the spout, a cut-off or stop mechanism H acting on the supply duct to stop flow therethrough, cell operating means J, and a drive K for the means J.

The mechanism shown at the right throughout the drawings may be identical with that shown at the left, or, as illustrated in the drawings, it may be modified somewhat to accommodate a liquid different from that handled by container B. In the drawings the container B' at the right varies somewhat from container B, as does the supply duct D', and the cell C is of a size different from that shown at the left, but is structurally the same. The various other elements of the mechanism at the right may be identical with those of the mechanism shown at the left.

Considering, first, the mechanism shown at the left through the drawings, the container is a simple, typical liquid carrier or carton, with an elongate body 10, a bottom 11 and a top 12. I have, for purpose of example, shown a paper carton such as is normally used to carry milk, cream, or like liquids, and it is therefore in the nature of an expendable element that can be disposed of when empty. In the drawings a mounting bracket 15 is carried by the frame A to support the container B with the body 10 in an upright position, and being a typical container of the character above referred to the top 12 thereof is provided with a hinge type closure 16 which may be open when the mechanism is in use admitting atmospheric pressure to the liquid in the container so that the mechanism operates satisfactory without pressure locks.

The supply duct D is preferably a simple, flexible or resilient tube of rubber, or the like, and it can be advantageously formed so that it is round in cross sectional configuration and uniform in size throughout its length. The upper or receiving end of the duct D may be joined or coupled to the container B in any suitable manner. In the drawings I have shown a simple connection or fitting 20 applied to the lower end portion of container B with a receiving part 21 in the container and a duct receiving nipple at the exterior of the container. The fitting 20 is shown applied to or through the bottom 11 of container B and may, in practice, be a rigid part or fixture provided on the container. Where a close coupling of dispensers or mechanisms is important it is preferred to locate the fitting 20 close to one edge or corner of the container B at the bottom thereof, as is shown through out the drawings, thus making it possible to conveniently locate containers such as the container B and the container B' without interference such as is shown in Figs. 1, 2 and 3 of the drawings.

The measuring cell C is a unit of flexible or resilient material such as rubber, or the like, and in its preferred form it has an elongate tubular body 25 closed by ends 26 and 27. The body 25 can be advantageously formed so that it is round in cross sectional configuration and it is preferably vertically disposed so end 26 closes the upper end of the body while end 27 closes the lower end of the body. In practice the body 25 of the cell is of nominal size or diameter and the desired capacity is gained by making the cell of suitable length, in that cells of various lengths can be employed in the machine without modification or variation of the essential working parts.

The end 26 of the cell is preferably joined directly to the lower end of duct D, in fact, these parts are preferably formed of one single continuous body of rubber or like material.

The delivery spout E is located beyond or below the lower end 27 of the cell C and is preferably a simple straight elongate tube initially formed or provided with a lower end portion 30 which is closed and which is removed along a line of cut 31 when the machine is made ready for use. The spout E may, in practice, vary in length and may be positioned or disposed in any suitable manner, it being preferred, however, that it be made as short as circumstances permit so that there is little or no liquid retained in the spout following closing of valve F.

The valve F is an outlet valve normally closed and opened to pass fluid only when the fluid being held is subjected to a predetermined pressure or to a pressure exceeding a predetermined value. In its preferred form the valve F involves an elongate tubular body 40 and a core 41. The upper end of the valve body 40 is preferably joined directly to the end 27 of cell C while the lower end of the body is joined directly to the upper end of the spout E, at which point the body 40 has an inwardly projecting flange 42.

The core 41 of the valve shown alone in Fig. 5 of the drawings is preferably a single body or block of rigid material, for instance, it may be a molded member and it is of such size and shape as to normally occupy or plug the body 40 of the valve with the body completely surrounding and gripping the exterior of the core to maintain a seal that prevents fluid from leaking or escaping downwardly through the valve. Port 43 is provided in the core entering the core from one side thereof at a point well below the upper end 44 of the core and issuing downwardly from the lower end 45 of the core, preferably at the center thereof. The port may vary widely in form, size, capacity, etc. In the case illustrated it has a plurality of lateral portions that join an annular channel 46 in the exterior of the core near the lower end portion thereof, and the lateral portions of the core join a central portion that opens at the bottom end 45 of the core. It will be apparent from the drawings, and particularly from Figs. 5 and 7 of the drawings, that when pressure is applied to the cell C the body 40 of the valve is extended or expanded, allowing discharge or flow of liquid around the upper end portion of the core and out through the port 43 to finally discharge through the spout F.

The cut-off or stop means H provided by the present invention involves, generally, two relatively movable members at opposite sides of the supply duct D and means, preferably a spring 50, normally yieldingly urging the members together. In the preferred form of the invention shown in the drawings one of the members of means H is stationary and is in the form of an abutment 51 while the other is shiftable and is in the form of a plate 52. The duct D passes between the abutment 51 and the plate 52 as is shown throughout the drawings. The plate 52 is mounted to shift between a position where the tube D is undisturbed and is therefore open to pass liquid, and a position where the tube D is pinched down so that it is closed against the passage of any fluid whatsoever. In the particular case illustrated the plate 52 is mounted on a stem 55 supported in guides 56 so that it is free to reciprocate, and a helical compression spring 50 acts between one of the guides of the plate to normally yieldingly urge the plate 52 toward the abutment 51.

The cell operating means J involves two relatively movable elements and in the preferred form of the invention one of these elements is a stationary stop 60 while the other is a shiftable pressure plate or shoe 61. The cell C is located between the stop 60 and the shoe and the shoe is movable between a retracted position where it is spaced from the cell and a fully operated position where it squeezes the cell tight against the stop so that all liquid is discharged from the cell. In the particular case illustrated the shoe is carried on a stem 64 supported by roller guides 65 so that it is free to reciprocate.

In accordance with the present invention the means J is cooperatively related to the means H so that the action or operations of means H is governed by or through the means J to the end that when the means J is out of operation or is retracted the means H is likewise retracted, whereas when the means J is put into operation initial movement of the shoe 61 releases the plate 52 of means H so that the duct D is closed off before pressure is applied to the cell C to squeeze fluid therefrom. In the preferred arrangement the plate 52 has a depending portion or lip 70 which is in the path of travel of shoe 61. When the shoe moves back or to the retracted position it picks up the plate 52 through the lip 70 and moves it to the position shown in Fig. 3, as the shoe 61 advances toward the stop 60, and by the time the shoe reaches the cell the plate 52 has been urged by the spring 50 into engagement with the tube D so the tube is pinched against the abutment 52. After the shoe 61 has engaged the cell it moves on toward the stop 60, leaving the plate 51 holding the tube D closed.

The drive K provided for operating the means J may be any suitable driving or operating mechanism. In the particular case illustrated the drive involves a shaft 80 supported in the frame in any suitable manner so that it is free to rotate. The shaft 80 is operatively coupled with the stem 64 of means J through a suitable crank mechanism. The particular crank mechanism shown in the drawings involves a disc 72 on the shaft 80 to rotate therewith, a crank pin 73 on the disc and a yoke 74 on or connected in the stem 64 to receive the pin. As the shaft turns or rotates the rotation of the pin 73 causes reciprocation of the stem 64. It is to be understood that in practice the shaft 80 can be operated in any suitable manner or from any suitable source, as for example, through a coin control mechanism, a manually operated lever, etc.

It is to be observed that the valve F combined with the discharge spout E forms a depending unit that extends downwardly from the collapsible cell. Under some conditions, or in some instances, the cell, valve and spout being joined as an integral assembly, there may be a tendency for the valve and spout to become somewhat deflected or displaced as the cell is collapsed. To control any such displacement or movement of the valve and spout a suitable guide 96 is provided on frame A and may be a simple, tubular element receiving the valve and spout as shown throughout the drawings.

In the mechanism shown at the right in the drawings the container B' is somewhat different from that first described and is such as to carry liquid so that it is sealed from contact with air and yet is subject to atmospheric pressure. This particular container involves a body 10ª in the form of a bottle with a neck 10ᵇ. A collapsible envelope or bag 10ᶜ carries the liquid to be handled and is located within the bottle. The bag continues into or through the neck 10ᵇ where it is wrapped around the end of the neck and is sealed with the portion 85 of the duct D' which portion of the duct is engaged around the neck of the bottle, as clearly shown in Figs. 1 and 3 of the drawings. The duct D' in this case is proportioned somewhat differently from the duct first described, but is essentially the same, in that it forms a simple fluid handling connection between the container and the collapsible measuring cell, and is subject to being cut off or closed by the action of the means H.

The body 10ª is provided with an air inlet opening 95 so located in the body as to be at the upper portion thereof when the body is in operating position, as shown throughout the drawings. The opening 95 admits atmospheric pressure into the body to act upon the collapsible bag 10ᶜ. In practice a suitable mounting bracket 15ª, provided on frame A, supports the liquid carrier B' in the desired position. Where the carrier B' is in the shape or nature of a bottle, as shown throughout the drawings, the mounting 15ª may support it in a somewhat inclined or tilted position so that the neck 10ᵇ is immediately adjacent or in close proximity to the lower portion of liquid carrier B without crowding the carriers or requiring special formation for these elements.

The cell illustrated at the right is considerably smaller than that shown at the left and thus serves to demonstrate how this portion of the mechanism may be varied as to capacity. A feature of the invention is the coordination of the means J acting on the cells C so that a single stop 60 occurs between the two cells, which stop may be in the form of a thin rigid plate, as shown throughout the drawings. Through this arrangement and relationship of parts the measuring cells can be arranged close together, thus making it practical for the spouts to be close together and such as to advantageously deliver liquid into a common receptacle or cup 90, as shown in Fig. 2 of the drawings. It is to be understood, of course, that even though the cell operating means J of the two mechanisms are co-ordinated by the presence of the common plate C, these mechanisms need not be related to operate simultaneously, but can, if desired, be operated successively if circumstances so require.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. Apparatus for dispensing liquid including, a resilient supply duct, a resilient measuring cell receiving liquid from the duct and having a tubular outlet portion, an outlet valve core within said tubular outlet portion, said tubular outlet portion yieldingly engaging the core and being adapted to pass liquid around the core and out of the cell upon pressure developing on fluid in the said outlet portion, stop means adapted to engage and deform the duct and positively stop flow therethrough, and operating means adapted to engage and deform the cell to develop pressure on fluid in the cell so it is forced therefrom through said tubular portion, the stop means and operating means being interconnected so said action on the tube precedes that on the cell.

2. Apparatus for dispensing liquid including, a resilient supply duct, a resilient measuring cell receiving liquid from the duct, a resilient tubular outlet duct receiving liquid from the cell, stop means operating to deform the duct and stop flow therethrough, and operating means deforming the cell to force liquid therefrom, the stop means and operating means being interconnected so said action on the tube precedes that on the cell, and a rigid core in the outlet duct and mounted therein against movement lengthwise thereof and normally yieldingly embraced thereby, the core having a fluid passing port normally closed by the outlet duct and uncovered when the outlet duct is expanded away from the core.

3. Apparatus for dispensing liquid including, a resilient supply duct, a resilient measuring cell receiving liquid from the duct, a resilient tubular outlet duct receiving liquid from the cell, stop means operating to deform the duct and stop flow therethrough, and operating means deforming the cell to force liquid therefrom, the stop means and operating means being interconnected so said action on the tube precedes that on the cell, and a rigid unitary core in the outlet duct and normally yieldingly embraced thereby, the core having a fluid passing port therein normally closed by the duct and uncovered when the duct is expanded away from the core and the outlet duct having a portion maintained in tight sealing engagement with the core, the supply duct, the cell and the outlet duct being an integral unit of rubber-like material.

4. In liquid dispensing apparatus, a liquid carrier, a deformable duct in communication with the carrier and depending therefrom, a collapsible measuring cell below and receiving liquid from the duct, a normally yieldingly closed valve at the bottom of the cell adapted to pass liquid out of the cell, stop means operating to deform the duct and stop flow therethrough, and operating means collapsing the cell to force liquid therefrom and through the valve, the carrier including a rigid bottle with a collapsible lining therein carrying liquid having a single opening delivering the liquid to the tube and the bottle having an opening admitting atmospheric pressure to the exterior of the lining.

References Cited in the file of this patent

UNITED STATES PATENTS

| 920,250 | Blakeslee | May 4, 1909 |
| 1,392,601 | Rose | Oct. 4, 1921 |
| 2,393,838 | Tarbox | Jan. 29, 1946 |
| 2,412,397 | Harper | Dec. 10, 1946 |